(12) United States Patent
Otsuka et al.

(10) Patent No.: US 7,232,778 B2
(45) Date of Patent: Jun. 19, 2007

(54) SYNTHETIC QUARTZ GLASS INGOT, SYNTHETIC QUARTZ GLASS, AND METHODS OF MANUFACTURE THEREOF

(75) Inventors: Hisatoshi Otsuka, Niigata-ken (JP); Kazuo Shirota, Niigata-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 343 days.

(21) Appl. No.: 10/315,984

(22) Filed: Dec. 11, 2002

(65) Prior Publication Data

US 2003/0126889 A1 Jul. 10, 2003

(30) Foreign Application Priority Data

Dec. 11, 2001 (JP) ............... 2001-376641

(51) Int. Cl.
*C03C 3/06* (2006.01)
(52) U.S. Cl. ............... 501/54; 65/17.4; 65/17.6; 65/416
(58) Field of Classification Search ............... 501/54, 501/64; 428/426; 65/416, 17.4, 17.6
See application file for complete search history.

(56) References Cited

U.S. PATENT DOCUMENTS

| | | | | |
|---|---|---|---|---|
| 5,696,038 A | * | 12/1997 | Maxon ............... | 501/54 |
| 6,094,941 A | * | 8/2000 | Fujinoki et al. ............... | 65/30.1 |
| 6,189,339 B1 | * | 2/2001 | Hiraiwa ............... | 65/17.3 |
| 6,266,978 B1 | * | 7/2001 | Oshima et al. ............... | 65/33.2 |
| 6,473,226 B1 | * | 10/2002 | Jinbo et al. ............... | 359/355 |
| 6,499,315 B1 | * | 12/2002 | Nishimura et al. ............... | 65/17.4 |
| 6,761,951 B2 | * | 7/2004 | Otsuka et al. ............... | 428/64.1 |
| 6,776,006 B2 | * | 8/2004 | Best et al. ............... | 65/17.4 |

FOREIGN PATENT DOCUMENTS

| | | |
|---|---|---|
| EP | 0 525 984 A1 | 2/1993 |
| EP | 0 622 340 A1 | 11/1994 |
| EP | 0 735 006 A1 | 10/1996 |
| EP | 0 870 737 A1 | 10/1998 |
| EP | 1 033 350 A1 | 9/2000 |
| EP | 1 063 203 A1 | 12/2000 |
| EP | 1 067 096 A2 | 1/2001 |
| JP | 64-24032 * | 1/1989 |
| JP | 6-199532 A | 7/1994 |
| JP | 6-305736 A | 11/1994 |
| JP | 2001-19465 A | 1/2001 |

OTHER PUBLICATIONS

Khotimchenko et al., Journal: Zhurnal Prikladnoi Spektroskopii, vol. 46, No. 6, pp. 987-991 (Jun. 1987) (with English abstract).

* cited by examiner

*Primary Examiner*—Karl Group

(57) ABSTRACT

In a synthetic quartz glass ingot which is produced by vapor phase hydrolyzing or oxidatively decomposing a silica-forming starting compound in an oxyhydrogen flame such that silica growth in a direction occurs at a silica particle deposition and melting face, striae visible when viewed from a direction perpendicular to the silica growth direction are distributed periodically over the silica growth direction. The ingot can be used in the production of optical-grade high-homogeneity synthetic quartz glass elements for excimer laser applications, particularly ArF excimer laser applications, in the production of laser damage-resistant optical elements used with light sources such as excimer lasers, and in the production of UV optical fiber.

19 Claims, 1 Drawing Sheet

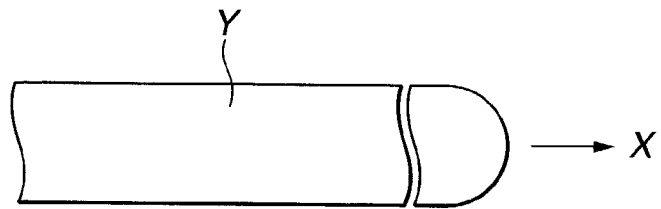
FIG.1A
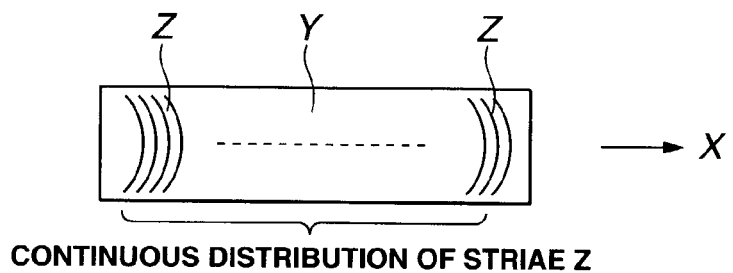
FIG.1B
CONTINUOUS DISTRIBUTION OF STRIAE Z
FIG.2
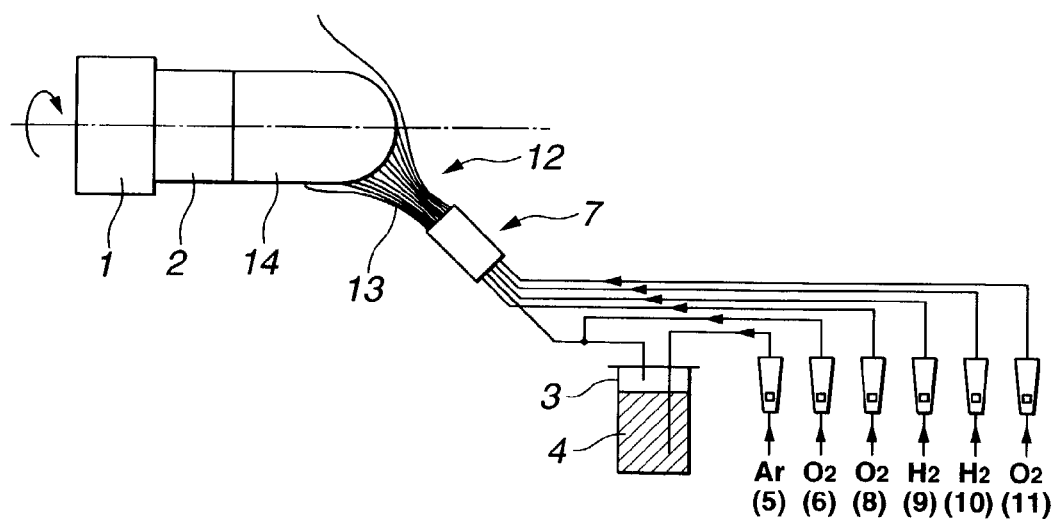

SYNTHETIC QUARTZ GLASS INGOT, SYNTHETIC QUARTZ GLASS, AND METHODS OF MANUFACTURE THEREOF

The invention claimed in the present application was made pursuant to a joint research agreement entered into between Shin-Etsu Chemical Co., Ltd. and Shin-Etsu Quartz Products Co.

BACKGROUND OF THE INVENTION

1. Field of the Invention

The present invention relates to synthetic quartz glass ingots and synthetic quartz glasses from which can be made optical blanks of high optical homogeneity and low variation in light transmittance for optical elements, such as lenses, prisms, mirrors and windows, used with excimer lasers, and particularly ArF excimer lasers. The invention also relates to methods for producing such synthetic quartz glass ingots and synthetic quartz glasses.

2. Prior Art

The drive toward higher levels of integration in VLSI circuits has led to a need for submicron-scale exposure technology in the photolithographic systems used to form integrated circuit patterns on wafers. Light sources of increasingly shorter wavelength are being employed in exposure systems to carry out patterning to smaller linewidths. The i-line (wavelength, 365 nm), once the light source of choice in lithography steppers, has been largely supplanted by the KrF excimer laser (248 nm), and today ArF excimer lasers (193 nm) are starting to see industrial use. Lenses used in such steppers are required to have an outstanding ability to transmit ultraviolet light, good resistance to damage from UV light irradiation, and high homogeneity.

To avoid the presence of metallic impurities, which cause UV light absorption, transparent synthetic quartz glass for making such lenses and other optical elements is generally produced by feeding a high-purity silicone compound such as silicon tetrachloride in vapor form directly to an oxyhydrogen flame, flame hydrolyzing the vapor to form fine particles of silica, and depositing, melting and vitrifying the particles directly on a rotating heat-resistant substrate made of a material such as quartz glass.

Transparent synthetic quartz glass produced in this way has a good transmittance to short-wavelength radiation down to a wavelength of about 190 nm, and is used as a light-transmitting material for UV laser light, specifically i-line radiation, excimer laser light such as that from KrF (248 nm), XeCl (308 nm), XeBr (282 nm), XeF (351 and 353 nm) and ArF (193 nm) lasers, and the fourth harmonic (250 nm) of YAG lasers.

The new light absorption in the UV region that emerges when synthetic quartz glass is irradiated with UV light of intense energy such as an excimer laser is believed to be due to paramagnetic defects which arise from photoreactions caused by inherent defects within the synthetic quartz glass. Numerous instances of light absorption from paramagnetic defects have been identified in ESR and other spectra. Examples of such defects include E' centers (Si.) and non-bridging oxygen radicals (Si—O.).

Thus, paramagnetic defects generally have optical absorption bands. When quartz glass is irradiated with UV light, absorption bands of concern in the UV wavelength region due to paramagnetic defects in the quartz glass include bands at 215 nm and, though not yet precisely identified, 260 nm, both due to E' centers (Si.). In some cases, these absorption bands are relatively broad and absorption is strong. For example, when quartz glass is used as an ArF excimer laser or KrF excimer laser light-transmitting material, such absorption can be a major problem.

The inherent defects in synthetic quartz glass that give rise to paramagnetic defects include non-$SiO_2$ structures such as Si—OH and Si—Cl, oxygen deficient structures such as Si—Si, and oxygen surplus structures such as Si—O—O—Si.

One way to suppress paramagnetic defects is taught in JP-A 6-199532, which discloses a method wherein a chlorine-free alkoxysilane such as tetramethoxysilane is used as the silica-forming compound to prevent Si—Cl structures, a type of paramagnetic defect-inducing structural defect, from being included within the glass.

The presence of at least a given concentration of hydrogen molecules in quartz glass is known to discourage the formation of E' centers (Si.), one type of oxygen defect, thus enhancing the laser durability of the glass.

ArF excimer laser light causes a level of damage in quartz glass which is several times greater than that by KrF excimer laser light. Hence, quartz glass for ArF excimer laser applications must have a hydrogen molecule concentration several times higher than that of quartz glass for KrF excimer laser applications.

A method of controlling the hydrogen molecule concentration in synthetic quartz glass is described in the prior art (JP-A 6-305736). The current practice is to adjust the concentration of hydrogen molecules in glass in accordance with the intended ArF laser energy use conditions.

Extensive research has thus been devoted to improving the laser durability of quartz glass as the light sources used in photolithography have become of increasingly shorter wavelength and more intense (as illustrated by the shift from i-line irradiation to excimer laser light).

Such shifts to shorter wavelength lithography are also changing expectations with regard to optical elements used in exposure tools (e.g., lenses, windows, prisms). One distinct trend recently has been toward a higher numerical aperture in the projection lens materials used in exposure tools. The steady rise in the aperture of the lens material has been accompanied by a need for lens materials of greater (more precise) homogeneity. In addition to the homogeneity of the index of refraction, a very important problem concerning ArF excimer lasers has been that of reducing birefringence. Quartz glass in particular, when exposed to light having a wavelength shorter than 200 nm, has been found to experience a loss in the constancy of its photoelastic coefficient, with sudden, large changes in value. At a wavelength of 193 nm, the photoelastic coefficient rises to a value about 1.5 times greater than that at a wavelength of 633 nm. The influence of birefringence on the resolution is thus even larger now than before. Accordingly, as with the need to achieve greater refractive index homogeneity, it has become essential also to reduce birefringence to the lowest possible level.

Hydroxyl group concentration, chlorine concentration and fictive temperature are well-known parameters in quartz glass that determine the homogeneity of the refractive index distribution. By suitably combining the distribution profiles of these parameters within the glass, it has been possible to reduce the refractive index distribution $\Delta n$ to a value on the order of $1 \times 10^{-6}$. However, in methods that increase the refractive index homogeneity by combining the distribution profiles of these parameters in such a way as to cancel out their respective influences on the refractive index, particularly with the use of chlorine-free synthetic quartz glass having a hydroxyl group concentration of more than 1,000 ppm to confer ArF excimer laser resistance, the following observations have been made:

(1) Synthetic quartz glass ingots which are chlorine-free and have a high hydroxyl group concentration tend to have a higher viscosity at elevated temperatures, making the glass ingot more difficult to homogenize.
(2) A high degree of homogeneity is required in the large-aperture products that have emerged from recent efforts to achieve higher levels of circuit integration by increasing numerical aperture.
(3) Because little has been done in the past to minimize birefringence, a certain degree of birefringence is unavoidable.

Hence, although synthetic quartz glasses obtained in this way can be used to make optical components for KrF excimer lasers, they do not meet the much stiffer requirements for refractive index distribution Δn and birefringence associated with ArF excimer laser-related applications.

SUMMARY OF THE INVENTION

It is therefore an object of the invention to provide synthetic quartz glass ingots and synthetic quartz glasses from which can easily be obtained optical blanks of high homogeneity for optical elements, such as lenses, prisms and windows, used with excimer lasers. An additional object of the invention is to provide methods for producing such synthetic quartz glass ingots and synthetic quartz glasses.

We have discovered that a synthetic quartz glass ingot produced by vapor phase hydrolyzing or oxidatively decomposing a silica-forming starting compound in an oxyhydrogen flame such that silica growth in a direction occurs at a silica particle deposition and melting face, and characterized in that (i) striae visible when viewed in a direction perpendicular to the silica growth direction are distributed periodically in the silica growth direction,
(ii) the striae have a distribution of at least one stria per centimeter in the silica growth direction,
(iii) the striae have a shape which is axially symmetric about a center axis in the silica growth direction face and identical or similar in shape to the silica growth direction face, and
(iv) the stria have a visibility which meets striae grade B, grade C or grade D of U.S. military specification MIL-G-174B, when subjected to homogenizing treatment to remove the stria, enables synthetic quartz glass to be achieved in which the refractive index variation and birefringence are reduced to minimum levels.

Accordingly, in a first aspect, the invention provides a synthetic quartz glass ingot which is produced by vapor phase hydrolyzing or oxidatively decomposing a silica-forming starting compound in an oxyhydrogen flame such that silica growth in a direction occurs at a silica particle deposition and melting face, and in which striae visible when viewed in a direction perpendicular to the silica growth direction are distributed periodically in the silica growth direction.

The striae preferably have a distribution of at least one stria per centimeter in the silica growth direction, a shape which is axially symmetric about a center axis in the silica growth face direction and identical or similar in shape to the silica growth direction face, and/or a visibility which meets striae grade B, grade C or grade D of U.S. military specification MIL-G-174B.

The synthetic quartz glass ingot of the invention typically has a hydroxyl group distribution in a plane that is parallel to the silica growth direction and includes a center axis in the growth face, which distribution has points of inflection at the striae.

It is advantageous for the synthetic quartz glass ingot to have:

(i) an internal transmittance to 193.4 nm wavelength radiation of at least 99.70%,
(ii) a hydroxyl group concentration in the glass of 700 to 1,000 ppm, and
(iii) a hydrogen molecule concentration of at least $3\times10^{18}$ molecules/cm$^3$.

The silica-forming starting compound used to make the synthetic quartz glass ingot is preferably chlorine-free.

In a second aspect, the invention provides a synthetic quartz glass produced by subjecting the above-described inventive synthetic quartz glass ingot having striae distributed periodically in the silica growth direction to homogenizing treatment by a zone melting process so as to remove the striae.

In a third aspect, the invention provides a method for producing the synthetic quartz glass ingot according to the first aspect of the invention, which method includes supplying a silica-forming starting compound to an oxyhydrogen flame, vapor phase hydrolyzing or oxidatively decomposing the compound in the flame so as to form fine particles of silica, depositing the silica particles on a target, and concurrently melting and vitrifying the particles to form a synthetic quartz glass ingot; wherein supply of the silica-forming starting compound is interrupted at predetermined time intervals so as to form in the ingot striae which correspond to the interruptions in supply of the silica-forming starting compound.

Preferably, in the foregoing method, each time the silica-forming starting compound is supplied for a period of 10 to 60 minutes, supply of the compound is interrupted for a length of time corresponding to from $\frac{1}{20}$ to $\frac{1}{1}$ the length of the supply period.

The silica-forming starting compound used in the above method of the invention is preferably a chlorine-free organooxysilane or organooxysiloxane.

Preferably, in the above-described method of the invention, the silica-forming starting compound and oxygen have a molar mixing ratio which represents at least 1.3 times the stoichiometric amount of oxygen; when the silica-forming starting compound is vapor phase hydrolyzed or oxidatively decomposed in an oxyhydrogen flame, the molar ratio of the actual amount of oxygen to the stoichiometric amount of oxygen required by the silica-forming starting compound and the hydrogen is from 0.6 to 1.3; and melting and vitrification at the growth face take place in a temperature range having a minimum temperature of at least 1,800° C.

In a fourth aspect, the invention provides a method of producing synthetic quartz glass, wherein a striae-bearing synthetic quartz glass ingot is obtained by the above-described ingot-producing method of the invention, following which the ingot is homogenized by a zone melting process to remove the striae.

BRIEF DESCRIPTION OF THE DRAWINGS

FIG. 1 schematically shows an example of the distribution and shape of striae in a synthetic quartz glass ingot. FIG. 1A shows the ingot, and FIG. 1B shows striae in the ingot.

FIG. 2 is a schematic diagram showing an example of an apparatus for producing synthetic quartz glass.

DESCRIPTION OF THE PREFERRED EMBODIMENTS

The objects, features and advantages of the invention will become more apparent from the following detailed description, taken in conjunction with the attached diagrams.

The synthetic quartz glass ingot of the invention is produced by what is known as the direct process from fine particles of silica generated by the vapor phase hydrolysis or oxidative decomposition of a silica-forming starting compound in an oxyhydrogen flame such that silica growth occurs in a direction at a silica particle deposition and melting face. In the synthetic quartz glass ingot of the invention, the striae visible when viewed in a direction perpendicular to the silica growth direction are distributed periodically over the silica growth direction.

That is, when a rod-shaped synthetic quartz glass ingot from which the peripheral layer of silica soot has been removed by grinding with a cylinder grinder is examined with a polarizing plate using a distortion inspecting device, striae are visible when viewed in a direction perpendicular to the direction of silica growth (FIG. 1B). In FIGS. 1A and 1B, X represents the direction of silica particle melting and deposition (growth direction), Y is the synthetic quartz glass ingot, and Z represents the striae. The striae at this time preferably have a shape which is axially symmetric about a center axis in the silica growth direction face, and identical or similar in shape to the silica growth direction face. The striae exist at positions on the ingot where supply of the silica-forming starting compound was interrupted during silica particle deposition, and the striae preferably have a visibility which corresponds to striae grade B, grade C or grade D of U.S. military specification MIL-G-174B.

The striae visible when viewed in a direction perpendicular to the direction of silica growth have a distribution of preferably at least one stria, more preferably 1 to 4 striae, and most preferably 1 to 2 striae, per centimeter in the growth direction.

These striae correspond to areas on the ingot where supply of the silica-forming starting compound was temporarily stopped and the ingot was exposed to the oxyhydrogen flame alone. It is preferable for the ingot to have a hydroxyl group distribution with points of inflection at the striae, such that the hydroxyl group concentration is higher at these points of inflection. In one illustrative example, the hydroxyl group concentration on the center axis of the ingot in the silica growth direction has points of inflection at the striae, with the hydroxyl group concentration at these point of inflection areas being 950 ppm and the hydroxyl group concentration in non-striae areas being lower. The non-striae areas, which are those areas of the ingot where the silica-forming starting compound is supplied and the silica grows continuously, have a hydroxyl group concentration of 750 ppm. In this case, the hydroxyl group concentration on the center axis in the silica growth direction is thus distributed within a range of about 750 to 950 ppm.

The ingot according to the invention has an internal transmittance to 193.4 nm wavelength radiation of preferably at least 99.70%. The hydroxyl group concentration in the glass is preferably from 700 to 1,000 ppm, and most preferably 800 to 900 ppm. Moreover, a hydrogen molecule concentration of at least $3 \times 10^{18}$ molecules/cm$^3$, preferably $3 \times 10^{18}$ to $6 \times 10^{18}$ molecules/cm$^3$, and most preferably $3 \times 10^{18}$ to $4 \times 10^{18}$ molecules/cm$^3$, is desirable for good resistance to laser damage.

When a synthetic quartz glass ingot having such periodic striae is converted into synthetic quartz glass by a known homogenizing process, glass that is striae-free in three directions can be obtained, although it can be used as well to prepare single-direction striae-free optical-grade synthetic quartz glass blanks. Such glass can be used to fabricate optical elements for illumination systems used in exposure tools and other equipment in which the light source is excimer laser light having a wavelength of less than 250 nm.

Because such treatment also makes the hydroxyl group concentration in the synthetic quartz glass uniform, a birefringence of less than 1 nm/cm can be achieved by carrying out annealing treatment to make the fictive temperature (FT) distribution uniform.

The striae are now described more fully. The presence of defects expressed by chemical formulas, such as oxygen deficiency defects (Si—Si) and oxygen surplus defects (Si—O—O—Si), basically poses no obstacle to attaining a practical level of stability to ArF excimer laser irradiation in synthetic quartz glass materials from which optical elements for such applications as ArF excimer laser exposure systems are to be made. However, it is necessary to heal very subtle defects in which the Si—O—Si bond angle lies outside the range of stability, such as highly stretched or compressed Si—O—Si bonds. One known way of doing so is a process in which growth is carried out very slowly by setting the growth rate during quartz glass synthesis to less than 2 mm per hour. This approach has two drawbacks: productivity is low, resulting in poor cost-effectiveness, and the glass thus produced has a hydroxyl group concentration in excess of 1,000 ppm.

We have discovered that one effective way to overcome this problem is to use a process in which periodic striae are deliberately formed in the growth direction by growing the quartz glass ingot at a relatively fast growth rate, but periodically interrupting the supply of the starting material and allowing the growth end of the ingot to be thoroughly heated in an oxyhydrogen or other flame.

The term "striae" refers herein to areas of the ingot where the glass undergoes a large change in refractive index over a short distance. Sudden changes in hydroxyl group concentration and density reportedly occur at the striae, which are thus points of abrupt structural change. We have found that by deliberately creating such points of structural discontinuity during growth of the quartz glass and concentrating in these areas very subtle defects of the type mentioned above in which the Si—O—Si bond angle lies outside the range of stability, such as excessively stretched or compressed Si—O—Si bonds or Si—O—Si bonds, molecular bonds in the layers between the striae can be stabilized.

Moreover, the deliberate creation of such striae has made it possible to grow ingots at a higher speed. The growth rate of ingots is very closely associated with their diameter. Yet, by using the above-described process, a 140 mm diameter ingot grown at a rate of about 10 to 20 mm per hour which is subjected to homogenization treatment then annealed will yield a quartz glass body having a laser durability comparable to that of synthetic quartz glass grown by a conventional process at a rate of 2 mm or less per hour.

Synthetic quartz glass obtained at a relatively high growth rate under such production conditions has a relatively low hydroxyl group concentration. This makes it easy to hold the hydroxyl group concentration of a quartz glass body obtained at the above growth rate to a level of not more than 1,000 ppm and to adjust the hydroxyl group concentration within the range at which homogenization treatment by a zone melting process is most efficient. It also makes it easy to achieve the hydrogen concentration required for good laser durability.

The inventive method of producing synthetic quartz glass ingots is described. The method involves supplying a silica-forming starting compound to an oxyhydrogen flame, vapor phase hydrolyzing or oxidatively decomposing the compound in the flame so to form fine particles of silica, depositing the silica particles on a target, and concurrently melting and vitrifying the deposited particles to form a synthetic quartz glass ingot. During this process, supply of the silica-forming starting compound is interrupted at predetermined time intervals so as to form in the ingot striae which correspond to the interruptions in supply of the silica-forming starting compound.

The silica-forming starting compound used in the foregoing process is an organosilicon compound. Preferred examples include chlorine-free silane compounds and siloxane compounds of general formula (1), (2) or (3) below:

$$(R^1)_n Si(OR^2)_{4-n} \quad (1)$$

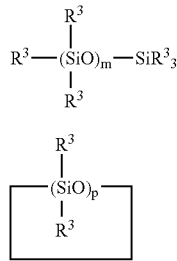

In the above formulas, $R^1$ and $R^2$ are like or unlike aliphatic monovalent hydrocarbon groups; $R^3$ is a hydrogen atom or an aliphatic monovalent hydrocarbon group; the letter m is at least 1, and preferably 1 or 2; the letter n is an integer from 0 to 3; and the letter p is an integer from 3 to 5.

Illustrative examples of the aliphatic monovalent hydrocarbon groups represented by $R^1$, $R^2$ and $R^3$ include $C_{1-4}$ alkyls such as methyl, ethyl, propyl, n-butyl and tert-butyl; $C_{3-6}$ cycloalkyls such as cyclohexyl; and $C_{2-4}$ alkenyls such as vinyl and allyl.

Specific examples of suitable silane compounds of above general formula (1) include $Si(OCH_3)_4$, $Si(OCH_2CH_3)_4$ and $CH_3Si(OCH_3)_3$. Specific examples of suitable siloxane compounds of above general formula (2) or (3) include hexamethyldisiloxane, hexamethylcyclotrisiloxane, octamethylcyclotetrasiloxane and decamethylcyclopentasiloxane.

A quartz burner that forms the oxyhydrogen flame is supplied with the silane or siloxane compound starting material, a combustible gas such as hydrogen, carbon monoxide, methane or propane, and a combustion-supporting gas such as oxygen.

The apparatus used to produce the synthetic quartz glass ingot may have a vertical construction or a horizontal construction like that shown in FIG. 2.

As noted above, the synthetic quartz glass ingot of the invention has an internal transmittance at a wavelength of 193.4 nm which is preferably at least 99.70%. This is because, when optical elements made from this synthetic quartz glass ingot are used, they will sometimes be required to have an internal transmittance at the particular wavelength in use, such as 193.4 nm in the case of ArF excimer lasers, of at least 99.70%. At an internal transmittance of less than 99.70%, when the ArF excimer laser light passes through a quartz glass element, light energy is absorbed and converted to heat energy, which may cause changes in the density of the glass and may also alter its refractive index. For instance, the use of a synthetic quartz glass ingot having an internal transmittance of less than 99.70% as a lens material for an exposure system which employs an ArF excimer laser as the light source may give rise to undesirable effects such as distortion of the image plane due to changes in the refractive index of the lens material.

For this reason, it is desirable for the silica-forming starting compound and oxygen fed to the burner to have a molar mixing ratio which represents at least 1.3 times, and preferably 2.0 to 3.0 times, the stoichiometric amount of oxygen.

The molar ratio of the actual amount of oxygen to the stoichiometric amount of oxygen required by the silica-forming starting compound (a silane or siloxane compound) and hydrogen fed to the burner is preferably from 0.6 to 1.3, and most preferably from 0.7 to 0.9.

The vitrification temperature has a temperature distribution at the growth face. By setting the minimum temperature at this time to at least 1,800° C., and preferably at least 2,000° C. (with an upper limit of up to 2,500° C., and preferably up to 2,400° C.), it is possible to enlarge the region in which the internal transmittance of the synthetic quartz glass at a wavelength of 193.4 nm is maintained at a minimum of 99.70%. The gas balance, such as that between oxygen and hydrogen, has a large impact on the melting and vitrification temperature at this growth face. Moreover, in the practice of the invention, as striae are deliberately distributed periodically in the direction of silica growth, the high-temperature region at the melting face on the growth end of the ingot expands when supply of the starting material is interrupted. Hence, the melting face tends to have a smaller difference between the maximum and minimum temperatures than the temperature distribution during conventional feeding of the starting material. This stabilizes bonds in the layers between striae, and makes it all the more possible to enlarge the region having an internal transmittance of at least 99.70%.

That is, we have found that, in the relationship of the melting and vitrification temperature at the growth face versus transmittance, the melting face temperature exerts an influence on the transmittance at wavelengths shorter than 200 nm, and particularly at the wavelength of ArF excimer laser light (193.4 nm). Thus, at a higher melting and vitrification temperature, it is possible to maintain an internal transmittance of at least 99.70%. Moreover, within this range of conditions, it is also possible to maintain the hydrogen molecule concentration in the synthetic quartz glass at a level of at least $3 \times 10^{18}$ molecule/$cm^3$ and thus achieve good long-term stability during excimer laser irradiation. When the above molar ratio of actual oxygen to the stoichiometric amount of oxygen is less than 0.6, the temperature at the silica growth face declines, discouraging silica growth, which may result in an internal transmittance at 193.4 nm of less than 99.70%. The same holds true in cases where the molar mixing ratio of silica-forming starting compound and oxygen falls below 1.3 times the stoichiometric amount of oxygen.

The burner to which the silane compound, a combustible gas such as hydrogen and a combustion-supporting gas such as oxygen are fed may be a type of burner commonly used for this purpose, such as one in which the center portion has a multi-tube, and particularly a three-tube or five-tube, construction.

Striae can be formed by intermittently feeding the silica-forming starting compound under the above conditions. In the inventive process, each time the silica-forming starting compound has been supplied for a period of 10 to 60 minutes, and preferably 20 to 50 minutes, it is desirable to interrupt the supply of starting compound for a length of time corresponding to $1/20$ to $1/1$, and preferably $1/10$ to $1/5$, the length of the supply period. The visibility, or heaviness, of the striae is related to the length of time supply of the silica-forming starting compound is interrupted. A long period of interruption results in more clearly visible (heavier) striae. When supply is interrupted for more than 60 minutes, silica sublimation occurs, which may lower the rate of silica growth and reduce productivity.

Thus, the silica-forming starting compound is typically supplied continuously for perhaps 40 minutes, following which supply of the silica-forming starting compound is interrupted and the silica growth face is exposed to the oxyhydrogen flame and melted for perhaps 5 minutes. Supply of the silicon-forming starting material is then begun once again, and the above operation is repeated. This operation is automatically valve controlled with a sequencer and periodically repeated to produce the synthetic quartz glass ingot.

In the ingot produced by this method, the striae visible when viewed in a direction perpendicular to the direction of silica growth have a distribution of preferably at least one stria per centimeter in the direction of growth. The striae have a shape which is preferably axially symmetric about the center axis of the growth face and arches out toward the periphery. The striae in the synthetic quartz glass ingot thus obtained have a visibility which meets preferably striae grade B, grade C or grade D of U.S. military specification MIL-G-174B.

The resulting synthetic quartz glass ingot can then be subjected to homogenization by a zone melting process to yield a synthetic quartz glass which is free of striae in three directions. That is, both ends of the synthetic quartz glass ingot are welded to synthetic quartz glass supporting rods held in a lathe and the ingot is drawn out to a diameter of 80 mm. One end of the ingot is then strongly heated with an oxyhydrogen burner to at least 1,700° C., and preferably at least 1,800° C., so as to form a melt zone. Next, the left and right chucks are rotated at different speeds to apply shear stress to the melt zone, thereby homogenizing the quartz glass ingot. At the same time, the burner is moved from one end of the ingot to the other end so as to homogenize the hydroxyl group concentration and hydrogen concentration within the ingot growth face. The resulting synthetic quartz glass is then typically molded to the desired dimensions, and subsequently annealed to a uniform fictive temperature. Annealing can be carried out by a conventional method.

Synthetic quartz glass obtained by homogenization in the above manner can be used to prepare optical-grade quartz glass blanks for a variety of optical elements, including elements such as stepper illumination system lenses, projection optical system lenses, windows, mirrors, beam splitters and prisms.

EXAMPLES

The following examples are provided to illustrate the invention, and are not intended to limit the scope thereof. Measurements of the hydroxyl group concentration, internal transmittance, birefringence, period and visibility of the striae, and hydrogen molecule concentration in the examples were carried out as follows.

Hydroxyl Group Concentration

Measured using infrared spectrophotometry. Specifically, the extinction coefficient of light at a wavelength of 4522 $cm^{-1}$ was determined by Fourier transform infrared spectrophotometry. The following conversion formula was used:

OH group concentration (ppm)=extinction coefficient at 4522 $cm^{-1}$×4,400.

Internal Transmittance

Measured by ultraviolet spectrophotometry.

Birefringence

Measured using an EXICOR 350AT birefringence measurement system made by Hinds Instruments.

Striae

Measured using a Schlieren instrument, in accordance with U.S. military specification MIL-G-174B.

Hydrogen Molecule Concentration

Measured by laser Raman spectrophotometry according to the method described in *Zhurnal Prikland noi Spektroskopii* 46, No. 6, 987-991 (1987). Measurement was carried out by photon counting using a laser Raman spectrometer NR-1000 (JASCO Co., Ltd.) and a photomultiplier R943-02 (Hamamatsu Photonics Co., Ltd.). In measurement of the hydrogen molecule concentration by argon laser Raman spectrophotometry, the measured values vary with the sensitivity curve of the detector. Values must thus be calibrated using a reference sample.

Examples 1 and 2 and Comparative Example 1

In each example, a synthetic quartz glass ingot was produced by feeding methyltrimethoxysilane as the starting material to a quartz burner, flame-hydrolyzing the silane in an oxyhydrogen flame to form fine particles of silica, then depositing and at the same time melting and vitrifying the silica particles on a rotating quartz glass target.

As shown in FIG. 2, a quartz glass target 2 was mounted on a rotating support 1. Argon 5 was introduced into the methyltrimethoxysilane 4 held in a starting material vaporizer 3. Methyltrimethoxysilane 4 vapor was carried out of the vaporizer by the argon 5, and oxygen 6 was added to the silane-laden argon to form a gas mixture, which was then fed to the center nozzle of a quartz burner 7. The burner 7 was also fed the following gases, in outward order from the foregoing gas mixture at the center: oxygen 8, hydrogen 9, hydrogen 10, and oxygen 11. The methyltrimethoxysilane starting material and an oxyhydrogen flame 12 were discharged from the burner 7 toward the target 2. Fine particles of silica 13 were deposited on the target 2 and simultaneously melted and vitrified as clear glass, forming a synthetic quartz glass ingot 14.

The production conditions used in each example are shown in Table 1.

The synthetic quartz glass ingot thus obtained had a diameter of 140 mm and a length of 500 mm. The ingot was subjected to homogenization by a zone melting process. The results for each example are shown in Table 1.

Quartz glass supporting rods were attached to both ends of the synthetic quartz glass ingot, and secured in the chucks on a lathe. The ingot was heated with a propane gas burner and turned on the lathe in such a way as to impart shear to the softened area of the ingot. The working temperature at this time was about 2,000° C. This step was followed by the homogenizing treatment described above.

The quartz glass ingot was raised to a temperature of 1,750° C. in an argon atmosphere at −266 hPa, and held at that temperature for one hour, giving a molded body having a diameter of 250 mm and a thickness of 157 mm. The body was then raised to a temperature of 1,150° C. in an air atmosphere, held at that temperature for 100 hours, then annealed at a ramp-down rate of not more than 0.1° C./min to a temperature of 600° C.

A sample 200 mm in diameter and 100 mm thick was cut from the resulting synthetic quartz glass blank, and inspected with a ZYGO Mark IV interferometer (Zygo Corporation). The glass was found to be striae-free in three directions, and to have a refractive index variation of less than $1 \times 10^{-6}$ and a birefringence of less than 1 nm/cm (ABR-10A automatic birefringence evaluation system, manufactured by Uniopt).

To check for the formation of paramagnetic defects under UV irradiation, a 15 mm thick sample was cut from the synthetic quartz ingot and machined to a mirror surface. Initial transmittance to 193.4 nm light at the center of the synthetic quartz glass ingot growth plane in this glass sample was measured using a Cary 400 spectrophotometer (Varian, Inc.). The hydrogen molecule concentration in the ingot was measured by a known method using a laser Raman spectrophotometer (NRS-2100, JASCO Corporation).

As described above and demonstrated in the examples, the invention provides synthetic quartz glass ingots from which can be produced optical-grade high-homogeneity synthetic quartz glass elements for excimer laser applications, particularly ArF excimer laser applications, laser damage-resistant optical elements and optical elements of other types used with light sources such as excimer lasers, and UV optical fibers.

Japanese Patent Application No. 2001-376641 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A synthetic quartz glass ingot,
   which is produced by vapor phase hydrolyzing or oxidatively decomposing a silica-forming starting compound in an oxyhydrogen flame such that silica growth in a direction occurs at a silica particle deposition and melting face, and
   which has striae, wherein
   the striae visible when viewed in a direction perpendicular to the silica growth direction are distributed periodically in the silica growth direction,
   the striae have a distribution of at least one stria per centimeter in the silica growth direction,
   the striae have a shape which is axially symmetric about the center axis of the growth face and arches out toward the periphery, and
   the striae have a visibility which meets striae grade B, grade C or grade D of U.S. military specification MIL-G-174B.

2. The synthetic quartz glass ingot of claim 1, wherein the striae have a distribution of 1 to 4 stria(e) per centimeter in the silica growth direction.

3. The synthetic quartz glass ingot of claim 1, wherein the striae have a shape which is identical or similar in shape to the silica growth direction face.

4. The synthetic quartz glass ingot of claim 1 having a hydroxyl group distribution in a place that is parallel to the silica growth direction and includes a center axis in the growth face, which distribution has points of inflection at the striae.

5. The synthetic quartz glass ingot of claim 1, having:
   (i) an internal transmittance to 193.4 nm wavelength radiation of at least 99.79%,
   (ii) a hydroxyl group concentration in the glass of 700 to 1,000 ppm, and
   (iii) a hydrogen molecule concentration of at least $3 \times 10^{18}$ molecules/cm$^3$.

6. The synthetic quartz glass ingot of claim 1, wherein the silica-forming starting compound is chlorine-free.

7. A method of producing the synthetic quartz glass ingot of claim 1, which method comprises supplying a silica-forming starting compound to an oxyhydrogen flame, vapor phase hydrolyzing or oxidatively decomposing the compound in the flame so as to form fine particles of silica, depositing the silica particles on a target, and concurrently

TABLE 1

| | Starting material feed period (min) | Starting material interruption period (min) | Period of striae (striae/cm) | Visibility of striae[1] (grade) | OH group concentration (ppm) min | OH group concentration (ppm) max | Transmittance (193.4 nm)[2] (%) | Hydrogen molecule concentration ($\times 10^{18}$ molecules/cm$^3$) | After homogenization Δn ($\times 10^{-6}$)[3] | After homogenization Birefringence (nm/cm) |
|---|---|---|---|---|---|---|---|---|---|---|
| Example 1 | 50 | 10 | 1.25 | C | 720 | 930 | 99.78 | 4.5 | 2.4 | 0.8 |
| Example 2 | 40 | 5 | 1.1 | C | 700 | 850 | 99.75 | 5.0 | 2.7 | 1.0 |
| Comparative Example 1 | continuously fed | 0 | 0 | A | 650 | 700 | 99.71 | 5.4 | 5.7 | 3.0 |

Notes:
[1] U.S. military specification MIL-G-174B.
[2] Internal transmittance at wavelength of 193.4 nm. Obtained by measuring the transmittance at center of growth plane in a 10 mm thick disk cut from synthetic quartz ingot, and dividing measured value by theoretical transmittance.
[3] Δn ($\times 10^{-6}$): Refractive index homogeneity of a homogenized quartz glass blank at working face through which light is passed (which face corresponds to a direction perpendicular to growth direction in synthetic quartz glass ingot from which blank was prepared).

melting and vitrifying the particles to form a synthetic quartz glass ingot; wherein supply of the silica-forming starting compound is interrupted at predetermined time intervals so as to form in the ingot striae which correspond to the interruptions in supply of the silica-forming starting compound.

8. The method of claim 7 wherein each time the silica-forming starting compound is supplied for a period of 10 to 60 minutes, supply of the compound is interrupted for a length of time corresponding to from ½ to ¼ the length of the supply period.

9. The method of claim 7, wherein the silica-forming starting compound is a chlorine-free organooxysilane or organooxysiloxane.

10. The method of claim 7, wherein the silica-forming starting compound and oxygen have a molar mixing ratio which represents at least 1.3 times the stoichiometric amount of oxygen; when the silica-forming starting compound is vapor phase hydrolyzed or oxidatively decomposed in an oxyhydrogen flame, the molar ratio of the actual amount of oxygen to the stoichiometric amount of oxygen required by the silica-forming starting compound and the hydrogen is from 0.6 to 1.3; and melting and vitrification at the growth face take place in a temperature range having a minimum temperature of at least 1,800° C.

11. A method of producing synthetic quartz glass, which method comprises:
supplying a silica-forming starting compound to an oxyhydrogen flame;
vapor phase hydrolyzing or oxidatively decomposing the compound in the flame so as to form fine particles of silica;
depositing the silica particles on a target, and concurrently melting and vitrifying the particles to form a synthetic quartz glass ingot, wherein supply of the silica-forming starting compound is interrupted at predetermined time intervals so as to form in the ingot striae which correspond to the interruptions in supply of the silica-forming starting compound, the striae being visible when viewed in a direction perpendicular to the silica growth direction being distributed periodically in the silica growth direction, the striae having a distribution of at least one stria per centimeter in the silica growth direction, the striae having a shape which is axially symmetric about the center axis of the growth face and arches out toward the periphery, and the striae having a visibility which meets striae grade B, grade C or grade D of U.S. military specification MIL-G-174B; and
then homogenizing the ingot by a zone melting process to remove the striae.

12. A synthetic quartz glass ingot,
which is produced by a process comprising the steps of:
supplying a silica-forming starting compound to an oxyhydrogen flame;
vapor phase hydrolyzing or oxidatively decomposing the compound in the flame so as to form fine particles of silica;
depositing the silica particles on a target such that silica growth in a direction occurs at a silica particle deposition and melting face and concurrently melting and vitrifying the particles to form a synthetic quartz glass ingot; and
interrupting the supply of the silica-forming starting compound at predetermined time intervals so as to form in the ingot striae which correspond to the interruptions in supply of the silica-forming starting compound, and
which has striae, wherein
the striae visible when viewed in a direction perpendicular to the silica growth direction are distributed periodically in the silica growth direction, the striae have a distribution of at least one stria per centimeter in the silica growth direction; and
the striae correspond to the interruptions in supply of the silica-forming starting compound.

13. The synthetic quartz glass ingot of claim 12, wherein the striae have a visibility which meets striae B, grade C or grade D of U.S. military specification MIL-G-174B.

14. A synthetic quartz glass ingot,
which is produced by a method comprising the steps of:
supplying a silica-forming starting compound to an oxyhydrogen flame;
vapor phase hydrolyzing or oxidatively decomposing the compound in the flame so as to form fine particles of silica;
depositing the silica particles on a target such that silica growth in a direction occurs at a silica particle deposition and melting face and concurrently melting and vitrifying the particles to form a synthetic quartz glass ingot; and
interrupting the supply of the silica-forming starting compound at predetermined time intervals so as to form striae which correspond to the interruptions in supply of the silica-forming starting compound, and
which has striae, wherein
the striae visible when viewed in a direction perpendicular to the silica growth direction are distributed periodically in the silica growth direction,
the striae correspond to the interruptions in supply of the silica forming starting compound,
the striae have a distribution of at least one stria centimeter in the silica growth direction,
the striae have a shape which is axially symmetric about the center axis of the growth face and arches out toward the periphery, and
the striae have a visibility which meets striae grade B, grade C or grade D of U.S. military specification MIL-G-147B.

15. The synthetic quartz glass ingot of claim 1, wherein the striae have a distribution of 1 to 2 striae per centimeter in the silica growth direction.

16. The synthetic quartz glass ingot of claim 13, wherein the striae have a distribution of 1 to 4 striae per centimeter in the silica growth direction.

17. The synthetic, quartz glass ingot of claim 13, wherein the striae have a distribution of 1 to 2 striae per centimeter in the silica growth direction.

18. The synthetic quartz glass ingot of claim 14, wherein the striae have a distribution of 1 to 4 striae per centimeter in the silica growth direction.

19. The synthetic quartz glass ingot of claim 14, wherein the striae have a distribution of 1 to 2 striae per centimeter in the silica growth direction.

* * * * *

UNITED STATES PATENT AND TRADEMARK OFFICE
CERTIFICATE OF CORRECTION

PATENT NO.        : 7,232,778 B2                                  Page 1 of 1
APPLICATION NO.   : 10/315984
DATED             : June 19, 2007
INVENTOR(S)       : Hisatoshi Otsuka et al.

It is certified that error appears in the above-identified patent and that said Letters Patent is hereby corrected as shown below:

Title Page

Please delete item "(45)" and insert therefor the following:
--**Date of Patent:   *Jun. 19, 2007**"--

Please replace the paragraph beginning with (*) regarding the term of patent, with the following new paragraph:

--(*) Notice:    This patent is subject to a terminal disclaimer.
                 Subject to any disclaimer, the term of this patent is
                 extended or adjusted under 35 U.S.C. § 154(b)
                 by 343 days.--

Signed and Sealed this

Fourth Day of December, 2007

JON W. DUDAS
*Director of the United States Patent and Trademark Office*